US010218255B1

(12) United States Patent
Petersen

(10) Patent No.: US 10,218,255 B1
(45) Date of Patent: Feb. 26, 2019

(54) POWER CONVERTER WITH IMPROVED TRANSIENT LOAD RESPONSE

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/996,813

(22) Filed: Jun. 4, 2018

(30) Foreign Application Priority Data

Apr. 27, 2018 (DE) .................... 10 2018 206561.6

(51) Int. Cl.
*H02M 3/158* (2006.01)
*H02M 1/08* (2006.01)
(Continued)

(52) U.S. Cl.
CPC ............ *H02M 1/08* (2013.01); *H02M 3/156* (2013.01); *H02M 3/157* (2013.01); *H02M 3/158* (2013.01);
(Continued)

(58) Field of Classification Search
CPC .... H02M 3/156; H02M 3/158; H02M 3/1588; H02M 2003/1566; H02M 3/155; H02M 3/1582; H02M 2003/1557; H02M 3/157; H02M 2001/0012; H02M 3/1563; H02M 2001/0009
See application file for complete search history.

(56) References Cited

U.S. PATENT DOCUMENTS

| 2013/0234513 A1* | 9/2013 | Bayer | ..................... G05F 1/577 307/31 |
| 2013/0301314 A1* | 11/2013 | Fu | ......................... H02M 7/487 363/37 |

(Continued)

FOREIGN PATENT DOCUMENTS

DE    10 2016 225 795    6/2018

OTHER PUBLICATIONS

Integrated Power Conversion and Power Management, Presented at the 2016 Power SOC Conference, Oct. 3, 2016, 1 page.
(Continued)

*Primary Examiner* — Timothy J Dole
*Assistant Examiner* — Ishrat Jamali
(74) *Attorney, Agent, or Firm* — Saile Ackerman LLC; Stephen B. Ackerman

(57) ABSTRACT

A power converter which converts between a first current at a first voltage provided at a first node and a second current at a second voltage provided at a second node. The power converter has a flying capacitor, an inductor and five switches. Furthermore, the power converter has a control unit to control four switches during steady state operation within a sequence of different operations states, in order to set the second voltage or the second current to a target level. In addition, the control unit detects the occurrence of a load transient at the second node, and in reaction to detecting occurrence of a load transient, to at least partially close a bypass switch, in order to provide additional current from the flying capacitor to the second node or in order to divert current from the inductor towards the reference potential.

30 Claims, 5 Drawing Sheets

(51) Int. Cl.
*H02M 3/156* (2006.01)
*H02M 3/157* (2006.01)
*H02M 1/00* (2006.01)
*H02M 3/155* (2006.01)

(52) U.S. Cl.
CPC ....... *H02M 3/1563* (2013.01); *H02M 3/1582* (2013.01); *H02M 3/1588* (2013.01); *H02M 2001/0009* (2013.01); *H02M 2001/0012* (2013.01); *H02M 2001/0045* (2013.01); *H02M 2003/1557* (2013.01); *H02M 2003/1566* (2013.01)

(56) References Cited

U.S. PATENT DOCUMENTS

| | | |
|---|---|---|
| 2015/0061613 A1 | 3/2015 | Kondou |
| 2015/0097542 A1 | 4/2015 | Repton et al. |
| 2015/0222135 A1 | 8/2015 | Lee |
| 2016/0190921 A1 | 6/2016 | Kumar et al. |
| 2017/0302093 A1* | 10/2017 | Petersen ............... H02J 7/0029 |

OTHER PUBLICATIONS

"FIVR—Fully Integrated Voltage Regulators on 4th Generation Intel Core TM SoCs," by Edward A. Burton et al., 2014 IEEE Applied Power Electronics Conference and Exposition—APEC 2014, Mar. 16-20, 2014, pp. 432-439.

Integrated Power Conversion Strategies across Laptop, Server and Graphics Product, by Sam Naffziger, 2016 Power SOC Conference, Oct. 3-5, 2016, 29 pgs.

"Multi-Level Conversion: High Voltage Choppers and Voltage-Source Inverters," by T.A. Meynard et al., 23rd Annual IEEE Power Electronics Specialists Conference PESC '92 Record, Jun. 29-Jul. 3, 1992, pp. 397-403.

Three-Level Buck Converter for Envelope Tracking in RF Power Amplifiers, by Vahid Yousefzadeh et al., Twentieth Annual IEEE Applied Power Electronics Conference and Exposition, APEC 2005, Mar. 6-10, 2005, pp. 1588-1594.

"A Fully-Integrated 3-Level DC-DC Converter for Nanosecond-Scale DVFS," by Wonyoung Kim et al., IEEE Journal of Solid-State Circuits, vol. 47, No. 1, Jan. 2012, pp. 206-219.

"Hybrid Buck-Linear (HBL) Technique for Enhanced Dip Voltage and Transient Response in Load-Preparation Buck (LPB) Converter," by Chun-Jen Shih et al., 2011 Proceedings of the ESSCIRC, Sep. 12-16, 2011, pp. 431-434.

"A Fast-Transient-Response Hybrid Buck Converter with Automatic and Nearly-Seamless Loop Transition for Portable Applications," by Yonggen Liu et al., 2012 Proceedings of the ESSCIRC, Sep. 17-21, 2012, pp. 165-168.

10.6 "A 30MHz Hybrid Buck Converter with 36mV Droop and 125ns 1% Settling Time for a 1.25A/2ns Load Transient," by Lin Cheng et al., Session 10 / DC-DC Converters / 10.6, 2017 IEEE International Solid-State Circuits Conference (ISSCC), Feb. 5-9, 2017, pp. 188-190.

German Office Action, File Number: 10 2018 206 561.6, Applicant: Dialog Semiconductor (UK) Limited, dated Nov. 20, 2018, 6 pages, and English language translation, 7 pages.

\* cited by examiner

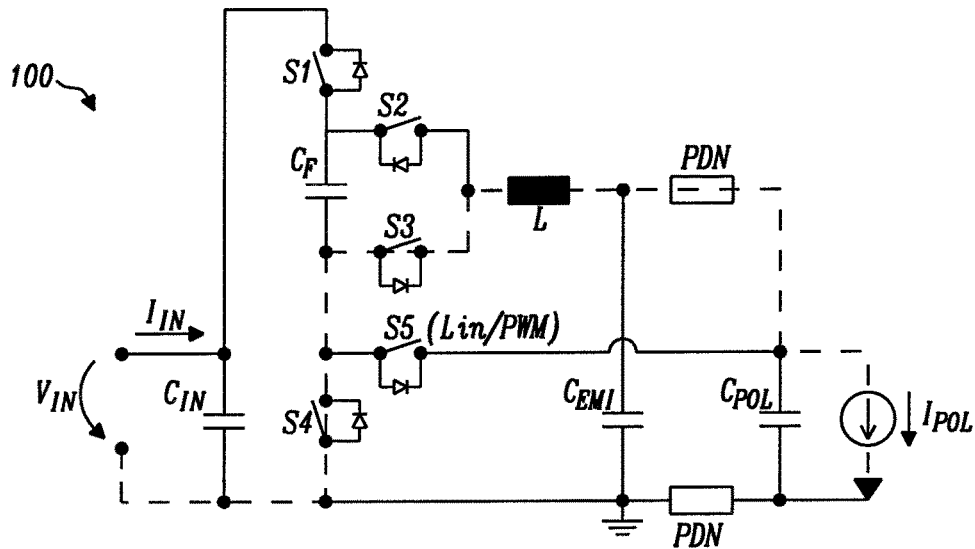

401
Controlling the first, second, third and fourth switch S1, S2, S3, S4 during steady state operation within a sequence of different operations states, in order to set the second voltage or the second current to a target level 402
Detecting occurrence of a load transient at the second node 403
Closing the bypass switch S5 in order to provide additional current from the flying capacitor $C_F$ to the second node of the power converter or in order to divert current from the inductor L towards the refence potential

FIG. 4

POWER CONVERTER WITH IMPROVED TRANSIENT LOAD RESPONSE

TECHNICAL FIELD

The present document relates to DCDC switching power converters. In particular, the present document relates to improving the transient load response of a DCDC power converter.

BACKGROUND

DCDC switching converters are being designed to supply more and more complicated and highly integrated System-on-Chip (SoC) designs with fast transient load response being crucial for efficient operation and optimum performance. Various techniques have been proposed to improve the transient response by enhancing the speed of the controller response. Fast non-linear (hysteretic) control provides a close to ideal response, but typically remains limited due to the inductor slew rate. Multiphase topologies may be used to increase the slew rate of the (effective) inductor, at the expense of using a plurality of relatively bulky inductors that increase both volume and cost.

Another way to improve transient load response (at a given inductor current ripple) is using increased switching frequencies. Acceptable converter efficiency at increased switching frequencies requires the use of switches with improved figure-of-merit (FOM, which depends on the capacitance Cg and the resistance Rsp of the switch) as switching loss scales with frequency, therefore resulting in switches with reduced voltage rating. The reduced voltage rating of the switches typically makes the direct supply from a Lithium-Ion (LiIon) battery pack or a standard 5V or 12V power supply bus impossible. Therefore, a cascaded conversion via voltage pre-regulation towards an intermediate bus level (e.g. 1.8V) is typically used. Such double conversion of power typically reduces the overall conversion efficiency and increases solution cost.

Increased inductor current slew rate (via a reduced effective inductance) can also be achieved by multi-level conversion. The inductor current ripple during steady state operation is reduced by distributing the input-to-output voltage drop across the serial connection of e.g. a capacitor and an inductor, thereby enabling reduced inductance in comparison to a pure inductor based buck converter. During transient load conditions, the full input-to-output voltage drop may be applied to the reduced inductance, thereby resulting in an increased inductor current slew rate.

Hybrid schemes that comprise the parallel operation of a DCDC converter and a linear regulator can further improve the transient load response by injecting additional charging current. However, depending on the input-to-output voltage conversion ratio, the linear regulator may be exposed to a relatively large delta voltage especially when providing relatively high current. This can trigger relatively large voltage-times-current products, which in case of frequent load changes may impact the converter reliability, overall conversion efficiency and application heat-up.

SUMMARY

The present document addresses the technical problem of providing a cost, area and power efficient power converter with an improved, notably an optimum, transient load response. According to an aspect, a power converter is described which is configured to convert between a first current at a first voltage provided at a first node and a second current at a second voltage provided at a second node. The first voltage and the second voltage are relative to a reference voltage. The power converter comprises a flying capacitor and an inductor, wherein a second port of the inductor is coupled to the second node of the power converter. Furthermore, the power converter comprises a first switch configured to couple or to decouple a first port of the flying capacitor to or from the first node of the power converter. In addition, the power converter comprises a second switch configured to couple or to decouple the first port of the flying capacitor to or from a first port of the inductor. The power converter further comprises a third switch configured to couple or to decouple a second port of the flying capacitor to or from the first port of the inductor. In addition, the power converter comprises a fourth switch configured to couple or to decouple the second port of the flying capacitor to or from the reference potential. Furthermore, the power converter comprises a bypass switch configured to couple or to decouple the second port of the flying capacitor to or from the second node of the power converter.

In addition, the power converter comprises a control unit configured to control the first, second, third and fourth switch during steady state operation of the power converter within a sequence of different operations states, in order to set the second voltage or the second current to a target level. The control unit is further configured to detect occurrence of a load transient at the second node of the power converter. Furthermore, the control unit is configured, in reaction to detecting occurrence of a load transient, to at least partially close the bypass switch, in order to provide additional current from the flying capacitor to the second node of the power converter or in order to divert current from the inductor towards the reference potential.

According to a further aspect, a method for operating a power converter is described. The method comprises controlling the first, second, third and fourth switch of the power converter during steady state operation within a sequence of different operations states, in order to set the second voltage or the second current at the second node of the power converter to a target level. Furthermore, the method comprises detecting occurrence of a load transient at the second node of the power converter. In addition, the method comprises, in reaction to detecting occurrence of a load transient, at least partially closing the bypass switch in order to provide additional current from the flying capacitor to the second node of the power converter or in order to divert current from the inductor towards the reference potential.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein
FIG. 4 shows a flow chart of an example method for operating a power converter.

DESCRIPTION

Figure 1A:
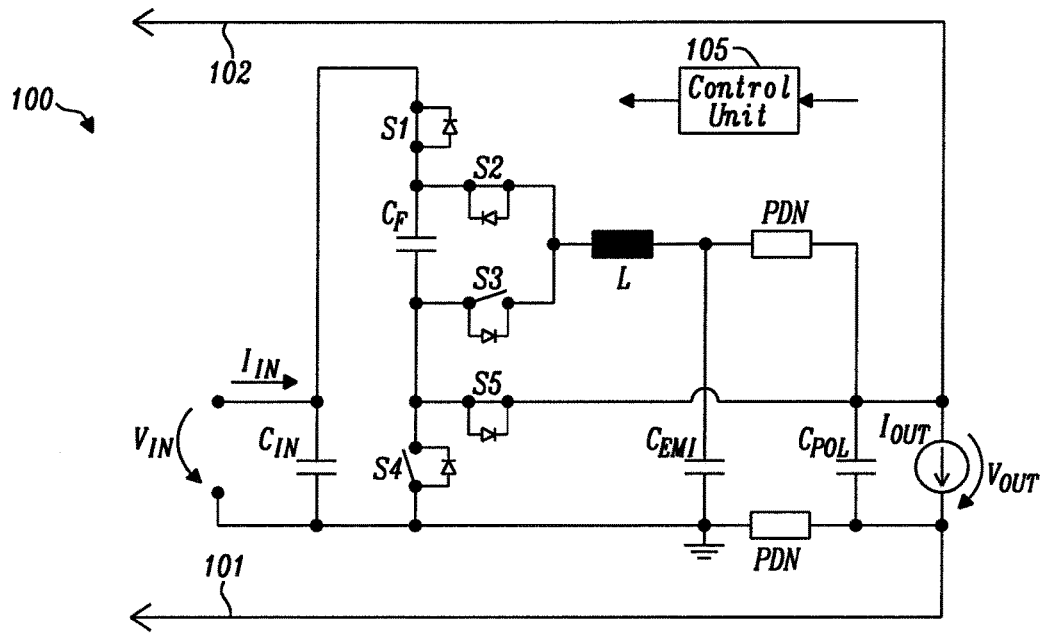
FIGS. 1A and 1B illustrate example power converters.

As outlined above, the present document is directed at providing a cost, area and power efficient DCDC power converter (notably a step-down converter) with improved transient load response. FIG. 1A shows a multi-level power converter 100 which comprises the switches S1, S2, S3 and S4 to arrange the flying capacitor $C_F$ and the inductor L in different operation phases, in order to set a defined conversion ratio between the input voltage $V_{IN}$ and the output voltage $V_{OUT}$. Furthermore, FIG. 1A illustrates the power distribution network (PDN) between the power converter 100 and a load, as well as the input capacitance $C_{IN}$, the output or load capacitance $C_{POL}$ and the EMI (electromagnetic interference) capacitance $C_{EMI}$.

In order to remove a voltage error caused by the power delivery network (PDN), the output voltage $V_{OUT}$ is typically sensed at the point-of-load (POL) e.g. via differential Kelvin contacts $V_{OUT\_P}$ and $V_{OUT\_N}$ (see reference signs 101, 102 in FIG. 1A).

Furthermore, the power converter 100 comprises a bypass switch S5, which may be used to provide current from the flying capacitor $C_F$ directly to the output node of the power converter 100 during a load transient, in order to rapidly provide the additionally required load current.

Hence, FIG. 1A shows a modified multi-level converter 100 that utilizes charge stored in the one or more flying capacitors $C_F$ for instantaneous current provision during fast transient load steps, until the average inductor current through the inductor L has been ramped to the new load current level.

Figure 2A:
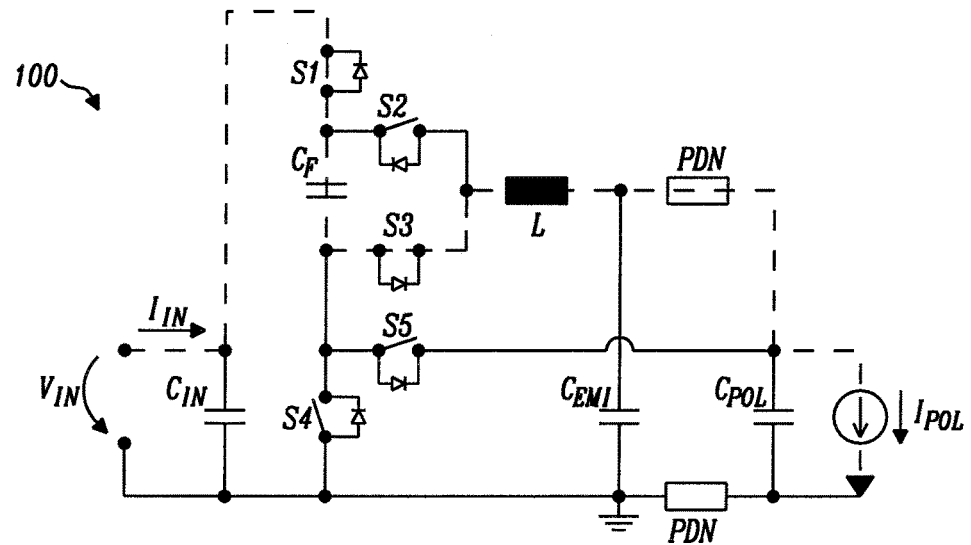
FIGS. 2A to 3C show example operation phases of the power converter of FIG. 1A.
Figure 2B:
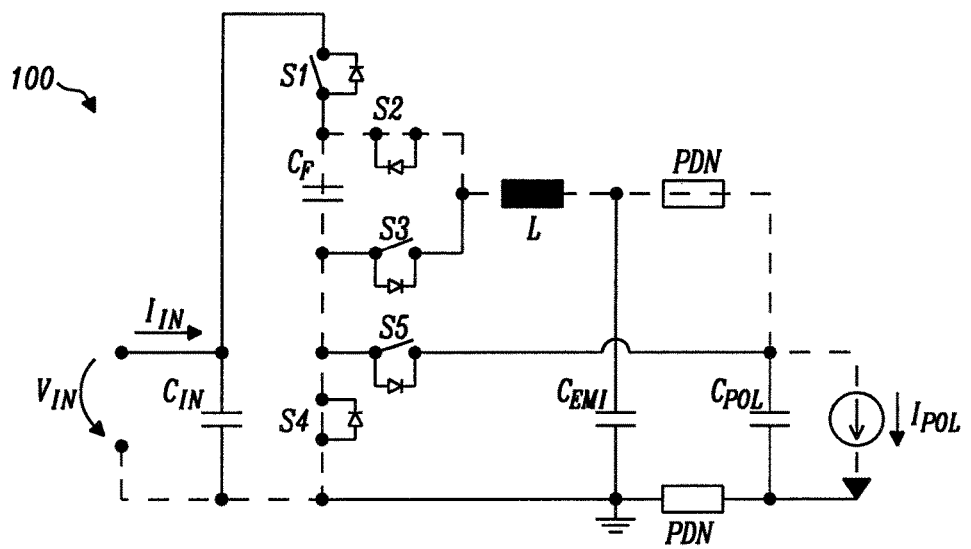

During steady state operation, the multi-level converter switching cycle typically comprises or consists of the two main phases shown in FIGS. 2A and 2B. During the operation phase of FIG. 2A, the inductor L is magnetized via the flying capacitor $C_F$, and during the operation phase of FIG. 2B, the inductor L is demagnetized via the flying capacitor $C_F$.

Figure 2C:
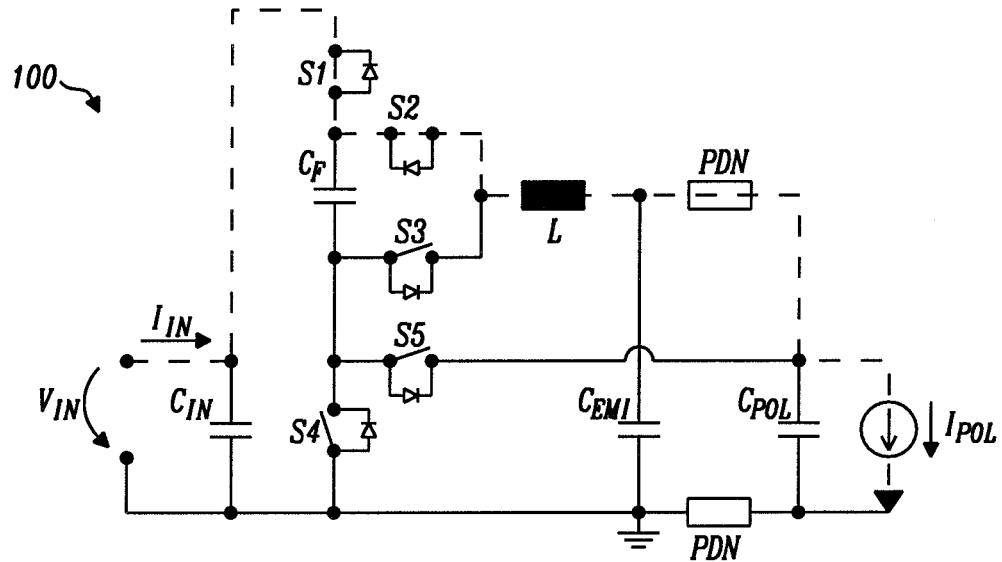
Figure 2D:
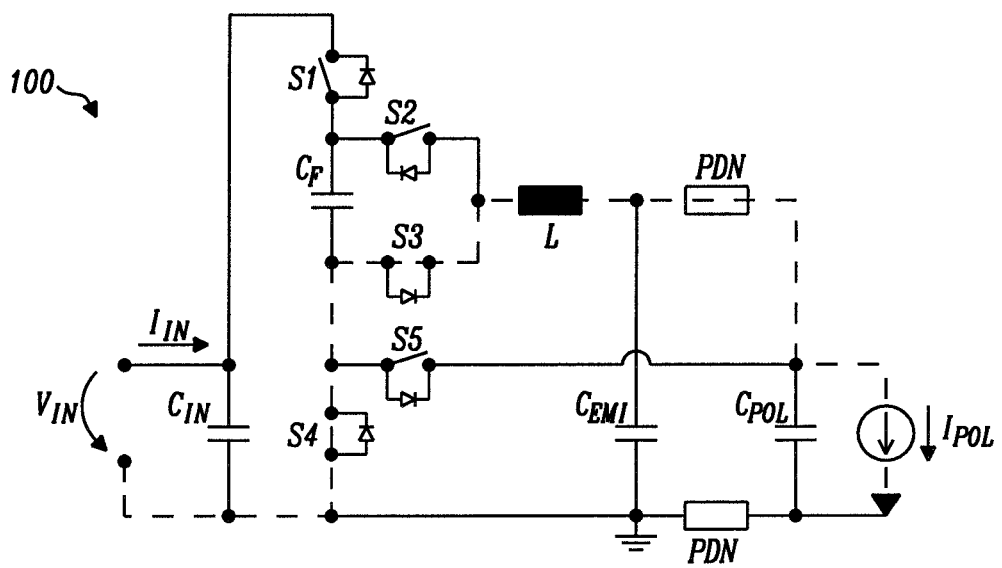

Relative duty cycle control of the operation phases shown in FIGS. 2A and 2B may be used to regulate the voltage across the flying capacitor $C_F$ towards a target level (which is referred to herein as the capacitor target level. Depending on the target level of the output voltage $V_{OUT}$ either a magnetizing phase as shown in FIG. 2C or a demagnetizing phase as shown in FIG. 2D may be inserted in between the operation phases from FIGS. 2A and 2B, wherein the duration of the operation phases of FIG. 2C or of FIG. 2D may be used to regulate the output voltage or the output current towards a given target value.

During steady state operation, the output current is provided along the dashed line with an arrow, shown in FIGS. 2A to 2D. The switch S5 typically remains open during steady state operation and the voltage across the flying capacitor $C_F$ is typically regulated towards a voltage level which is slightly less than $V_{IN}$-$V_{OUT}$. The delta between the capacitor voltage across the flying capacitor and $V_{IN}$-$V_{OUT}$ may be referred to as the delta voltage $V_D$ and may be set to be high enough to enable the provision of the current required during transient load conditions (via a closed switch S5), and/or low enough to avoid current flowing through the body diode of switch S5 during steady state operation. It should be noted that unintended body diode conduction of the bypass switch S5 (notably for relatively large $V_D$) may be avoided by using anti-serial back-to-back switches for the bypass switch S5 or by using a dynamic configuration of the FET substrate voltage level).

Figure 3A:
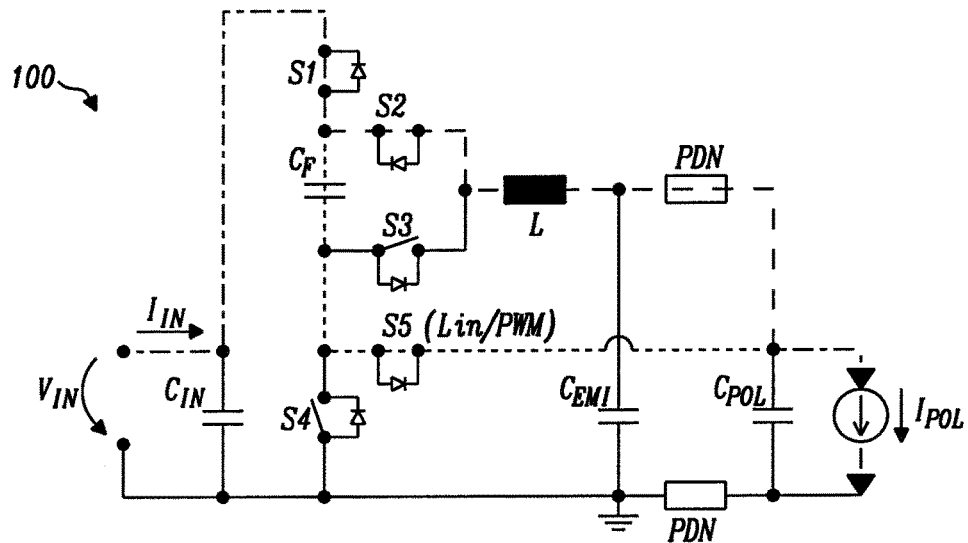

In case the output voltage $V_{OUT}$ drops below a predetermined lower threshold due to a transient load current, the control unit 105 of the power converter 100 may trigger the switches to immediately transition towards a magnetizing phase as shown in FIG. 3A (which may be referred to as a current delivery operation state). During the operation phase shown in FIG. 3A, load current is provided via the inductor L (shown by the dashed line) and via the flying capacitor $C_F$ (shown by the dotted line). Due to the fact, that the voltage at the input (left side) of switch S5 is higher than the output voltage $V_{OUT}$ (by the (relatively small) value of the delta voltage $V_D$), the switch S5 may be fully closed to provide the additional current required at the POL and at the decoupling capacitor $C_{POL}$ until the output voltage has recovered from the load transient. Such PWM (pulse width modulation) control of the switch S5 minimizes regulation loss. However, for more smooth transitions, the PWM control may be replaced by a linear regulation inside switch S5 (e.g. using an LDO).

Figure 3B:
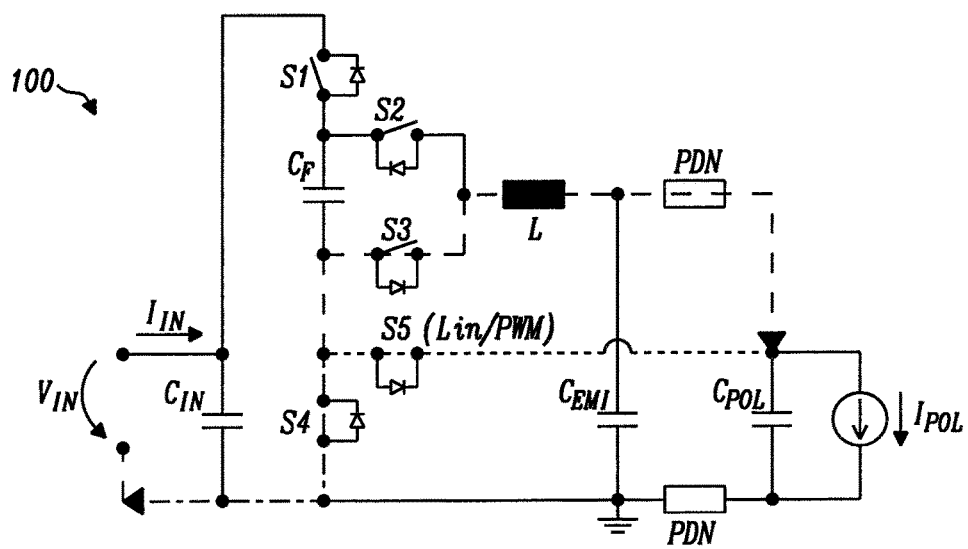

In case the output voltage $V_{OUT}$ rises above a predetermined upper threshold (which is higher than the target level for the output voltage), the steady state switching cycle may immediately be exited towards a demagnetizing phase as shown in FIG. 3B (which may be referred to as a current sink operation state). During the operation phase of FIG. 3B, the energy stored inside the inductor L (see dashed line) is discharged via S5 towards ground (see dotted line). Linear regulation inside switch S5 may be used to avoid a relatively large inrush current which could be caused by a completely closed switch S5 (which would shorten the voltage across $C_{POL}$ to ground).

A modified demagnetizing phase as shown in FIG. 3c removes the need for linear regulation inside switch S5 (by the use of body diode conduction). The serial connection of body diodes from switches S3 and S4 drops the voltage on the left side of the inductor L to approx. 1.4V below ground, so that the current inside the inductor may be ramped down relatively quickly, even when the output voltage $V_{OUT}$ is low. It has been shown, however, that this operation phase provides an inferior clamping of output voltage overshoots compared to the operation phase of FIG. 3b.

Figure 1B:
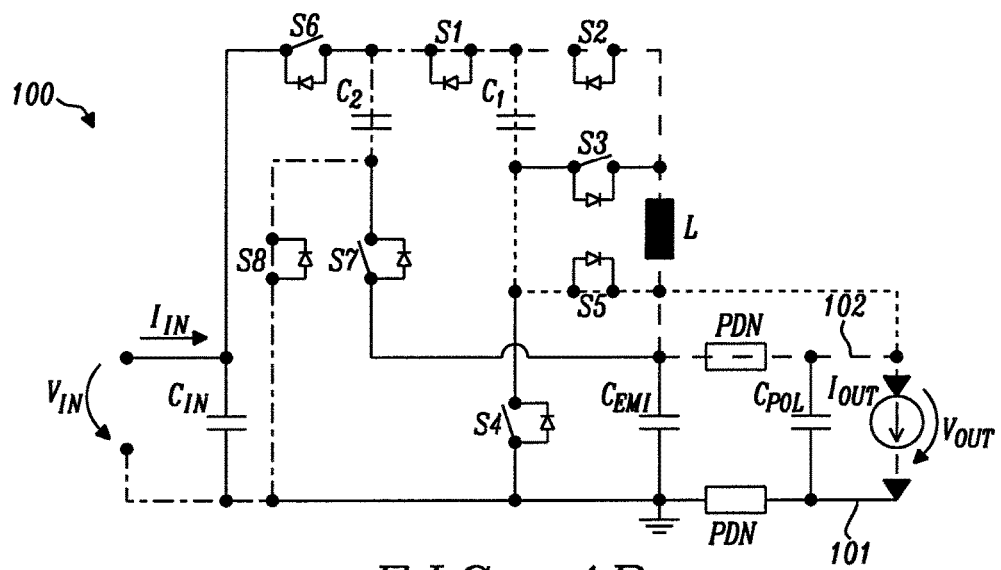

The principle of routing additional current towards the output node of a power converter 100, out from one or more accordingly pre-charged capacitors (by bypassing the limited current slew rate of one or more inductors inside the conversion path of the power converter 100 towards $V_{OUT}$) may be applied in various topologies. In particular, the principle may be applied to converter topologies with more than a single flying capacitor and/or with multiple inductors. FIG. 1b shows a converter 100 comprising two flying capacitors C1 and C2 and comprising the bypass switches S5 and S7. Hence, a power converter 100 may comprise more than one flying capacitor and/or more than one bypass switch.

Overall, a multi-level DCDC converter 100 with improved inductor current slew rate (derived from a serial capacitor during steady state operation) is described. The converter 100 comprises at least one bypass switch S5 for rapidly providing additional current bypassing the inductor L. For this purpose, the voltage across a flying capacitor of the converter 100 may be regulated to a pre-determined voltage level, which enables a reliable provision of additional current from the flying capacitor towards the output node of the power converter 100.

In other words, a power converter 100 is described, which is configured to convert between a first or input current $I_{IN}$ at a first or input voltage $V_{IN}$ provided at a first or input node or the power converter 100 and a second or output current $I_{OUT}$ at a second or output voltage $V_{OUT}$ provided at a second or output node of the power converter 100. The first voltage $V_{IN}$ and the second voltage $V_{OUT}$ are typically relative to a reference voltage (e.g. relative to ground). The power converter 100 may be configured to perform step-down conversion, such that the second voltage is equal to or smaller than the first voltage.

The power converter 100 comprises at least one flying capacitor $C_F$. Furthermore the power converter 100 comprises an inductor L. A second port of the inductor L may be (directly) coupled to the second (i.e. output) node of the power converter 100. The flying capacitor comprises a first port and a second port, wherein a capacitor voltage across the flying capacitor may be defined as the voltage between the first and the second port of the flying capacitor. Furthermore, the inductor comprises a first port and a second port, wherein a current through the inductor may be defined as the current from the first port to the second port (or vice versa) of the inductor L.

In addition, the power converter 100 comprises a set of switches, which may be used to arrange the flying capacitor and the inductor in different operation modes during the operation of the power converter 100. In particular, the power converter 100 may comprise a first switch S1 which is configured to couple or to decouple the first port of the flying capacitor $C_F$ (directly) to or from the first node of the power converter 100. In addition, the power converter 100 may comprise a second switch S2, which is configured to couple or to decouple the first port of the flying capacitor $C_F$ (directly) to or from the first port of the inductor L. Furthermore, the power converter 100 may comprise a third switch S3 which is configured to couple or to decouple the second port of the flying capacitor $C_F$ (directly) to or from the first port of the inductor L. In addition, the power converter 100 may comprise a fourth switch S4 which is configured to couple or to decouple the second port of the flying capacitor $C_F$ (directly) to or from the reference potential.

The first, second, third and fourth switch may be used during steady state operation of the power converter 100 to provide a conversion between electrical power provided at the first node and electrical power provided at the second node of the power converter 100. In particular, the power converter 100 may comprise a control unit 105 (e.g. a microprocessor and/or an analog control circuit) which is configured to control the first, second, third and fourth switch S1, S2, S3, S4 during steady state operation within a sequence of different operations states, in order to set the second voltage or the second current (at the second node of the power converter 100) to a target level. For this purpose, the control unit 105 may be configured to repeat the sequence of operation states during steady state operation at a cycle rate (e.g. at 10 MHz, 100 MHz, or more).

The first, second, third and fourth switch S1, S2, S3, S4 may be operated in a PWM mode, i.e. the switches may be either fully closed or fully open. Furthermore, the first, second, third and fourth switch S1, S2, S3, S4 may each be or may each comprise (metaloxide semiconductor) transistors.

The sequence of operation states may comprise a first operation state (as shown e.g. in FIG. 2A), during which the first switch S1 is (fully) closed, the second switch S2 is (fully) open, the third switch S3 is (fully) closed and the fourth switch S4 is (fully) open. Furthermore, the sequence of operation states may comprise a second operation state (as shown e.g. in FIG. 2b), during which the first switch S1 is (fully) open, the second switch S2 is (fully) closed, the third switch S3 is (fully) open and the fourth switch S4 is (fully) closed. The control unit 105 may be configured to adapt the duty cycle of the first and/or second operation states in order to regulate the capacitor voltage across the flying capacitor $C_F$ to a target level (referred to herein as the capacitor target level).

Alternatively or in addition, the sequence of operation states may comprise a third operation state (e.g. shown in FIG. 2C), during which the first switch S1 is (fully) closed, the second switch S2 is (fully) closed, the third switch S3 is (fully) open and the fourth switch S4 is (fully) open. Furthermore, the sequence of operation states may comprise a fourth operation state (e.g. shown in FIG. 2D), during which the first switch S1 is (fully) open, the second switch S2 is (fully) open, the third switch S3 is (fully) closed and the fourth switch S4 is (fully) closed. The control unit 105 may be configured to adapt the duty cycle of the third and/or fourth operation states in order to regulate the second voltage or the second current to the target level.

Hence, the power converter 100 may be configured to convert electrical power between an input (i.e. first) node and an output (i.e. second) node in a power efficient manner.

The power converter 100 further comprises at least one bypass switch S5 (e.g. with one or more (metalloxide semiconductor) transistors) which is configured to couple or to decouple the second port of the flying capacitor $C_F$ (directly) to or from the second node of the power converter 100. The bypass switch S5 may be used to bypass the inductor L, in order to provide current from the flying capacitor directly to the second node of the power converter 100 (without going through the inductor L). Alternatively or in addition, the bypass switch S5 may be used to sink current from the inductor L to the reference potential (notably to ground). As such, the bypass switch S5 may be used to enhance the performance of the power converter 100 in case of a load transient of a load that is coupled to the second node of the power converter 100.

In particular, the control unit 105 may be configured to detect occurrence of a load transient at the second node. The load transient at the second node may be detected based on an indication of the level of the second voltage and/or based on an indication of the level of the second current. The control unit 105 may be configured to determine the indication of the level of the second voltage using differential Kelvin contacts at the load which is supplied by the power converter 100.

Furthermore, the control unit 105 may be configured, in reaction to detecting occurrence of a load transient, to at least partially close the bypass switch S5, in order to provide additional current from the flying capacitor $C_F$ (directly) to the second node or in order to divert current from the inductor L towards the reference potential. As a result of this, the power converter 100 is enabled to react rapidly to a load transient, thereby improving the load transient performance of the power converter 100.

As indicated above, the control unit 105 may be configured to set the capacitor voltage across the flying capacitor to a capacitor target level during steady state operation. Furthermore, the control unit 105 may be configured to set the second voltage to a target level during steady state operation. In particular, the control unit 105 may be configured to set the capacitor voltage such that current from the flying capacitor flows to the second node of the power converter 100 in a reliable manner, subject to (at least partially) closing the bypass switch S5.

For this purpose, the control unit 105 may be configured to control the first, second, third and fourth switch S1, S2, S3, S4 during steady state operation in order to set the second voltage $V_{OUT}$ to the target level. Furthermore, the control unit 105 may be configured to control the first, second, third and fourth switch S1, S2, S3, S4 during steady state operation in order to set the capacitor voltage across the flying capacitor $C_F$ to the difference between the first voltage $V_{IN}$ and the target level for the second voltage $V_{OUT}$ minus a delta voltage. In other words, the capacitor target level may correspond to or may be equal to the difference between the first voltage $V_{IN}$ and the target level for the second voltage $V_{OUT}$ minus a delta voltage $V_D$ (i.e. $V_{IN}-V_{OUT, target}-V_D$). As a result of this, the voltage level at the second port of the flying capacitor is higher than the target level $V_{OUT, target}$ for the second voltage $V_{OUT}$. In particular, the voltage level at the second port of the flying capacitor may be equal to the target level $V_{OUT, target}$ for the second voltage $V_{OUT}$ plus the delta voltage $V_D$. As a result of this, a reliable flow of current from the flying capacitor to the second node of the power converter 100 may be ensured, if the bypass switch S5 is closed.

The delta voltage $V_D$ may be 20%, 10% or less of the difference between the first voltage $V_{IN}$ and the target level $V_{OUT, target}$ for the second voltage $V_{OUT}$ (wherein the first voltage is typically higher than the target level $V_{OUT, target}$ for the second voltage). In other words, the delta voltage $V_D$ may be relatively small compared to ($V_{IN}-V_{OUT, target}$), in order to limit the level of the inrush current into the bypass switch S5 when closing the bypass switch S5.

Alternatively or in addition, the delta voltage may be 1%, 2%, 5% or more of the difference between the first voltage $V_{IN}$ and the target level for the second voltage $V_{OUT}$, in order to ensure a reliable flow of current from the flying capacitor to the second node of the power converter 100, when the bypass switch S5 is closed.

In other words, the control unit 105 may be configured to control the first, second, third and fourth switch S1, S2, S3, S4 during steady state operation such that the capacitor voltage across the flying capacitor $C_F$ in combination with the first voltage $V_{IN}$ is higher than the target level for the second voltage $V_{OUT}$. Furthermore, the switches may be controlled such that the capacitor voltage across the flying capacitor $C_F$ in combination with the first voltage $V_{IN}$ is high enough to allow current from the flying capacitor $C_F$ to flow to the second node of the power converter 100, when the bypass switch S5 is at least partially closed. Furthermore, the switches may be controlled such that the capacitor voltage across the flying capacitor $C_F$ in combination with the first voltage $V_{IN}$ is sufficiently low to avoid conduction of a body diode of the bypass switch S5.

The bypass switch S5 is typically maintained (fully) open during steady state operation. As a result of this, the power efficiency of the power converter 100 is not affected by the bypass switch S5. The control unit 105 may be configured to detect (based on a measured indication of the second voltage) that the second voltage is at or below a lower voltage threshold and/or that the second current is at or above a higher current threshold (based on a measured indication of the second current). Furthermore, the control unit 105 may be configured, in reaction to this, to at least partially close the bypass switch S5 in order to provide additional current from the flying capacitor ($C_F$) to the second node of the power converter 100. Furthermore, the control unit 105 may control the first switch S1 to be (fully) closed (to allow the flying capacitor to be discharged). In addition, the control unit 105 may control the second switch S2 to be (fully) closed (in order to allow current to flow through the inductor L, thereby further increasing the second current at the second node of the power converter 100). In addition, the control unit 105 may control the third switch S3 and the fourth switch S4 to be (fully) open. As a result of such an operation of the power converter 100, the performance of the power converter 100 subject to a load increase may be improved.

Alternatively or in addition, the control unit 105 may be configured to detect (based on a measured indication of the second voltage) that the second voltage is at or above a higher voltage threshold and/or that the second current is at or below a lower current threshold (based on a measured indication of the second current). In addition, the control unit 105 may be configured, in reaction to this, to at least partially close the bypass switch S5 in order to divert current from the inductor L towards the reference potential. For this purpose, the fourth switch S4 may be (fully) closed. On the other hand, the first switch S1 and the second switch S2 may be (fully) open. The third switch S3 may be maintained open, and the flow of current may occur via the body diode of the third switch S3. As a result of such an operation of the power converter 100, the performance of the power converter 100 subject to a load decrease may be improved.

In other words, the control unit 105 may be configured to transition (from steady state operation) towards a current delivery operation state, subject to detecting a load increase (notably based on an indication of the second current and/or of the second voltage). During the current delivery operation state (as shown e.g. in FIG. 3A) the first switch S1 may be (fully) closed, the second switch S2 may be (fully) closed, the third switch S3 may be (fully) open, the fourth switch S4 may be (fully) open, and the bypass switch S5 may be at least partially closed.

Alternatively or in addition, the control unit 105 may be configured to transition (from steady state operation) towards a current sink operation state (as shown e.g. in FIG. 3B), subject to detecting a load decrease (notably based on an indication of the second current and/or of the second voltage). During the current sink operation state the first switch S1 may be (fully) open, the second switch S2 may be (fully) open, the third switch S3 may be (fully) open, the fourth switch S4 may be (fully) closed and the bypass switch S5 may at least partially be closed.

The control unit 105 may be configured to maintain the power converter 100 in the current delivery operation state or in the current sink operation state until it is detected (notably based on an indication of the second current and/or of the second voltage) that the load transient at the second node of the power converter 100 has been overcome. In particular, it may be detected that the second voltage is at or above a lower voltage threshold and at or below a higher voltage threshold, in order to detect that the load transient at the second node of the power converter 100 has been overcome).

In other words, the control unit 105 may be configured to detect that the load transient at the second node has been overcome (notably based on an indication of the second current and/or of the second voltage). In reaction to this, steady state operation may be resumed. Hence, a power efficient power converter 100 with improved load transient performance may be provided.

The control unit 105 may be configured to operate the bypass switch S5 in a linear mode with a variable on-resistance, notably in dependence of a level of the second voltage and/or in dependence of a level of a current through the bypass switch S5. By doing this, a controlled provision of additional current to the second node of the power converter 100 may be provided.

Alternatively or in addition, the control unit 105 may be configured to operate the bypass switch S5 in a pulse width modulation (PWM) mode, with the bypass switch S5 being either fully closed or fully open. By doing this, additional current may be provided to the second node of the power converter 100 in a particularly power efficient manner.

FIG. 4 shows a flow chart of an example method 400 for operating a multi-level power converter 100. As outlined above, the power converter 100 may be configured to convert between a first current $I_{IN}$ at a first voltage $V_{IN}$ provided at a first node of the power converter 100 and a second current $I_{OUT}$ at a second voltage $V_{OUT}$ provided at a second node of the power converter 100. The power converter 100 may be configured to perform a down-conversion from the first voltage to the second voltage (such that the second voltage is equal to or smaller than the first voltage).

The power converter 100 may comprise a flying capacitor $C_F$ and an inductor L, wherein the second port of the inductor L may be coupled to the second node. Furthermore, the power converter 100 may comprise: a first switch S1 configured to couple or to decouple a first port of the flying capacitor $C_F$ to or from the first node; a second switch S2 configured to couple or to decouple the first port of the flying capacitor $C_F$ to or from a first port of the inductor L; a third switch S3 configured to couple or to decouple a second port of the flying capacitor $C_F$ to or from the first port of the inductor L; a fourth switch S4 configured to couple or to decouple the second port of the flying capacitor $C_F$ to or from the reference potential; and a bypass switch S5 configured to couple or to decouple the second port of the flying capacitor $C_F$ to or from the second node of the power converter 100.

The method 400 comprises controlling 401 the first, second, third and fourth switch S1, S2, S3, S4 during steady state operation within a sequence of different operations states, in order to set the second voltage or the second current to a target level. Furthermore, the method 400 comprises detecting 402 occurrence of a load transient at the second node. In addition, the method 400 comprises, in reaction to detecting 402 occurrence of a load transient, at least partially closing 403 the bypass switch S5 in order to provide additional current from the flying capacitor $C_F$ to the second node of the power converter 100 or in order to divert current from the inductor L towards the reference potential.

The described converter 100 provides a high efficiency over a wide output current range using a single multi-level conversion stage. The converter 100 minimizes area/space requirements and makes use of a reduced number of (parallel) inductors. Furthermore, the converter 100 provides an optimum transient load response using a relatively low inductance and a hybrid topology. Current may be provided at relatively high regulation bandwidth. Furthermore, the voltage drop across the inductor bypass switch S5 may be minimized to increase efficiency.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to convert between a first current (IN) at a first voltage provided at a first node and a second current (IouT) at a second voltage provided at a second node; wherein the first voltage and the second voltage are relative to a reference voltage; wherein the power converter comprises a flying capacitor;
an inductor; wherein a second port of the inductor is coupled to the second node;
a first switch configured to couple or to decouple a first port of the flying capacitor to or from the first node;
a second switch configured to couple or to decouple the first port of the flying capacitor to or from a first port of the inductor;
a third switch configured to couple or to decouple a second port of the flying capacitor to or from the first port of the inductor;
a fourth switch configured to couple or to decouple the second port of the flying capacitor to or from the reference potential;
a bypass switch configured to couple or to decouple the second port of the flying capacitor to or from the second node; and
a control unit configured to
control the first, second, third and fourth switch during steady state operation within a sequence of different operations states, in order to set the second voltage or the second current to a target level;
detect occurrence of a load transient at the second node; and
in reaction to detecting occurrence of a load transient, at least partially close the bypass switch, in order to provide additional current from the flying capacitor to the second node or in order to divert current from the inductor towards the reference potential.

2. The power converter of claim 1, wherein the control unit is configured to control the first, second, third and fourth switch during steady state operation in order to set the second voltage to the target level; and
set a capacitor voltage across the flying capacitor to the difference between the first voltage and the target level for the second voltage minus a delta voltage.

3. The power converter of claim 2, wherein
the delta voltage is 20%, 10% or less of the difference between the first voltage and the target level for the second voltage; and/or
the delta voltage is 1%, 2%, 5% or more of the difference between the first voltage and the target level for the second voltage.

4. The power converter of claim 1, wherein the control unit is configured to control the first, second, third and fourth switch during steady state operation such that a capacitor voltage across the flying capacitor in combination with the first voltage is
higher than the target level for the second voltage;
high enough to allow current from the flying capacitor to flow to the second node, when the bypass switch is at least partially closed; and/or
sufficiently low to avoid conduction of a body diode of the bypass switch.

5. The power converter of claim 1, wherein the bypass switch is maintained open during steady state operation.

6. The power converter of claim 1, wherein the control unit is configured to
detect that the second voltage is at or below a lower voltage threshold and/or that the second current is at or above a higher current threshold; and
in reaction to this, at least partially close the bypass switch in order to provide additional current from the flying capacitor to the second node; and/or
detect that the second voltage is at or above a higher voltage threshold and/or that the second current is at or below a lower current threshold; and
in reaction to this, at least partially close the bypass switch in order to divert current from the inductor towards the reference potential.

7. The power converter of claim 1, wherein
the control unit is configured to transition towards a current delivery operation state, subject to detecting a load increase; and
during the current delivery operation state the first switch is closed, the second switch is closed, the third switch is open, the fourth switch is open, and the bypass switch is at least partially closed; and/or
the control unit is configured to transition towards a current sink operation state, subject to detecting a load decrease; and
during the current sink operation state the first switch is open, the second switch is open, the third switch is open, the fourth switch is closed and the bypass switch is at least partially closed.

8. The power converter of claim 7, wherein the control unit is configured to maintain the power converter in the current delivery operation state or in the current sink operation state until it is detected that the load transient at the second node has been overcome, notably until it is detected that the second voltage is at or above a lower voltage threshold and at or below a higher voltage threshold.

9. The power converter of claim 1, wherein the control unit is configured to
detect that the load transient at the second node has been overcome; and
in reaction to this, resume steady state operation.

10. The power converter of claim 1, wherein the control unit is configured to
operate the bypass switch in a linear mode with a variable on-resistance, notably in dependence of a level of the second voltage and/or in dependence of a level of a current through the bypass switch; or
operate the bypass switch in a pulse width modulation mode, with the bypass switch being either fully closed or fully open.

11. The power converter of claim 1, wherein the sequence of operation states comprises
a first operation state, during which the first switch is closed, the second switch is open, the third switch is closed and the fourth switch is open; and
a second operation state, during which the first switch is open, the second switch is closed, the third switch is open and the fourth switch is closed.

12. The power converter of claim 11, wherein the control unit is configured to adapt a duty cycle of the first and/or second operation states in order to regulate a capacitor voltage across the flying capacitor to a capacitor target level.

13. The power converter of claim 1, wherein the sequence of operation states comprises
a third operation state, during which the first switch is closed, the second switch is closed, the third switch is open and the fourth switch is open; and/or
a fourth operation state, during which the first switch is open, the second switch is open, the third switch is closed and the fourth switch is closed.

14. The power converter of claim 13, wherein the control unit is configured to adapt a duty cycle of the third and/or fourth operation states in order to regulate the second voltage or the second current to the target level.

15. The power converter of claim 1, wherein the control unit is configured to
repeat the sequence of operation states during steady state operation at a cycle rate; and/or
determine an indication of a level of the second voltage using differential Kelvin contacts at a load which is supplied by the power converter; and/or
detect occurrence of a load transient at the second node based on an indication of a level of the second voltage.

16. A method for operating a power converter; wherein the power converter is configured to convert between a first current at a first voltage provided at a first node and a second current at a second voltage provided at a second node; wherein the first voltage and the second voltage are relative to a reference voltage; wherein the power converter comprises a flying capacitor and an inductor; wherein a second port of the inductor is coupled to the second node; wherein the power converter comprises a first switch configured to couple or to decouple a first port of the flying capacitor to or from the first node; a second switch configured to couple or to decouple the first port of the flying capacitor to or from a first port of the inductor; a third switch configured to couple or to decouple a second port of the flying capacitor to or from the first port of the inductor; a fourth switch configured to couple or to decouple the second port of the flying capacitor to or from the reference potential; and a bypass switch configured to couple or to decouple the second port of the flying capacitor to or from the second node; wherein the method comprises
controlling the first, second, third and fourth switch during steady state operation within a sequence of different operations states, in order to set the second voltage or the second current to a target level;
detecting occurrence of a load transient at the second node; and
in reaction to detecting occurrence of a load transient, at least partially closing the bypass switch in order to provide additional current from the flying capacitor to the second node or in order to divert current from the inductor towards the reference potential.

17. The method of claim 16, wherein the control unit controls the first, second, third and fourth switch during steady state operation comprising the steps of:
- setting the second voltage to the target level; and
- setting a capacitor voltage across the flying capacitor to the difference between the first voltage and the target level for the second voltage minus a delta voltage.

18. The method of claim 17, wherein
- the delta voltage is 20%, 10% or less of the difference between the first voltage and the target level for the second voltage; and/or
- the delta voltage is 1%, 2%, 5% or more of the difference between the first voltage and the target level for the second voltage.

19. The method of claim 16, wherein the control unit controls the first, second, third and fourth switch during steady state operation such that a capacitor voltage across the flying capacitor in combination with the first voltage is
- higher than the target level for the second voltage;
- high enough to allow current from the flying capacitor to flow to the second node, when the bypass switch is at least partially closed; and/or
- sufficiently low to avoid conduction of a body diode of the bypass switch.

20. The method of claim 16, wherein the bypass switch is maintained open during steady state operation.

21. The method of claim 16, using the control unit comprising the steps of:
- detecting that the second voltage is at or below a lower voltage threshold and/or that the second current is at or above a higher current threshold; and
- in reaction to this, at least partially closing the bypass switch in order to provide additional current from the flying capacitor to the second node; and/or
- detecting that the second voltage is at or above a higher voltage threshold and/or that the second current is at or below a lower current threshold; and
- in reaction to this, at least partially closing the bypass switch in order to divert current from the inductor towards the reference potential.

22. The method of claim 16, wherein
- the control unit transitions towards a current delivery operation state, subject to detecting a load increase; and
- during the current delivery operation state the first switch is closed, the second switch is closed, the third switch is open, the fourth switch is open, and the bypass switch is at least partially closed; and/or
- the control unit transitions towards a current sink operation state, subject to detecting a load decrease; and
- during the current sink operation state the first switch is open, the second switch is open, the third switch is open, the fourth switch is closed and the bypass switch is at least partially closed.

23. The method of claim 22, using the control unit comprising the step of:
- maintaining the power converter in the current delivery operation state or in the current sink operation state until it is detected that the load transient at the second node has been overcome, notably until it is detected that the second voltage is at or above a lower voltage threshold and at or below a higher voltage threshold.

24. The method of claim 16, using the control unit comprising the steps of:
- detecting that the load transient at the second node has been overcome; and
- in reaction to this, resuming steady state operation.

25. The method of claim 16, using the control unit comprising the steps of:
- operating the bypass switch in a linear mode with a variable on-resistance, notably in dependence of a level of the second voltage and/or in dependence of a level of a current through the bypass switch; or
- operating the bypass switch in a pulse width modulation mode, with the bypass switch being either fully closed or fully open.

26. The method of claim 16, wherein the sequence of operation states comprises
- a first operation state, during which the first switch is closed, the second switch is open, the third switch is closed and the fourth switch is open; and
- a second operation state, during which the first switch is open, the second switch is closed, the third switch is open and the fourth switch is closed.

27. The method of claim 26, using the control unit comprising the step of:
- adapting a duty cycle of the first and/or second operation states in order to regulate a capacitor voltage across the flying capacitor to a capacitor target level.

28. The method of claim 16, wherein the sequence of operation states comprises
- a third operation state, during which the first switch is closed, the second switch is closed, the third switch is open and the fourth switch is open; and/or
- a fourth operation state, during which the first switch is open, the second switch is open, the third switch is closed and the fourth switch is closed.

29. The method of claim 28, using the control unit comprising the step of:
- adapting a duty cycle of the third and/or fourth operation states in order to regulate the second voltage or the second current to the target level.

30. The method of claim 16, using the control unit comprising the steps of:
- repeating the sequence of operation states during steady state operation at a cycle rate; and/or
- determining an indication of a level of the second voltage using differential Kelvin contacts at a load which is supplied by the power converter; and/or
- detecting the occurrence of a load transient at the second node based on an indication of a level of the second voltage.

* * * * *